United States Patent
Holmes et al.

(10) Patent No.: US 11,035,217 B2
(45) Date of Patent: *Jun. 15, 2021

(54) GRAPHICAL INDEXING FOR LIFE CYCLE MANAGEMENT OF DRILLING SYSTEM ASSETS

(71) Applicant: HYDRIL USA DISTRIBUTION LLC, Houston, TX (US)

(72) Inventors: John Steven Holmes, Houston, TX (US); Douglas Milliman, Houston, TX (US); Prakash Kumar Arcot, Houston, TX (US)

(73) Assignee: HYDRIL USA DISTRIBUTION LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,935

(22) Filed: Dec. 20, 2019

(65) Prior Publication Data

US 2020/0125429 A1 Apr. 23, 2020

Related U.S. Application Data

(62) Division of application No. 15/099,145, filed on Apr. 14, 2016, now Pat. No. 10,545,803.

(60) Provisional application No. 62/147,210, filed on Apr. 14, 2015.

(51) Int. Cl.
| | |
|---|---|
| *E21B 44/00* | (2006.01) |
| *G06F 9/54* | (2006.01) |
| *G06F 16/22* | (2019.01) |
| *G06Q 10/00* | (2012.01) |
| *G06F 3/0484* | (2013.01) |

(Continued)

(52) U.S. Cl.
CPC ........ *E21B 44/00* (2013.01); *E21B 33/0355* (2013.01); *G06F 3/0486* (2013.01); *G06F 3/04842* (2013.01); *G06F 9/543* (2013.01); *G06F 16/22* (2019.01); *G06Q 10/20* (2013.01)

(58) Field of Classification Search
CPC ...... E21B 44/00; E21B 33/0355; G06F 16/22; G06F 9/543; G06F 3/04842; G06F 3/0486; G06Q 10/20
See application file for complete search history.

(56) References Cited

U.S. PATENT DOCUMENTS

| | | |
|---|---|---|
| 4,109,938 A | 8/1978 | Mitchell et al. |
| 5,781,192 A | 7/1998 | Kodimer |
| 5,867,150 A | 2/1999 | Bricklin et al. |

(Continued)

OTHER PUBLICATIONS fgrimmer, Teradata Studio's Copy Objects via Drag and Drop, Nov. 15, 2013, developerTeradata.com, all pages (Year: 2013).

(Continued)

*Primary Examiner* — Roberto Borja
(74) *Attorney, Agent, or Firm* — Wood IP LLC

(57) ABSTRACT

Provided is a life cycle tracking system including a memory and a processor. The memory includes instructions that, when executed by the processor, cause the processor to perform certain operations. For example, the operations can include effecting a change in a first database including data related to a set of components installed on a blowout preventer stack, in response to a drag and drop operation having been performed on a human machine interface. The change can include associating information from a second database to the first database. The second database includes data related to a set of spare components.

14 Claims, 6 Drawing Sheets

(51) Int. Cl.
*G06F 3/0486* (2013.01)
*E21B 33/035* (2006.01)

(56) References Cited

U.S. PATENT DOCUMENTS

| | | | |
|---|---|---|---|
| 6,957,205 | B1 | 10/2005 | Liongosari |
| 6,990,498 | B2 | 1/2006 | Fenton et al. |
| 7,120,690 | B1 | 10/2006 | Krishnan |
| 8,724,957 | B2 | 5/2014 | Oisel et al. |
| 8,812,274 | B2 | 8/2014 | Virkar et al. |
| 2006/0106561 | A1 | 5/2006 | Thiesen |
| 2006/0179042 | A1 | 8/2006 | Bram |
| 2009/0089342 | A1 | 4/2009 | Runstedler |
| 2011/0153466 | A1 | 6/2011 | Harish |
| 2011/0320591 | A1 | 12/2011 | Ozaki |
| 2012/0233128 | A1 | 9/2012 | Solmer |
| 2014/0231075 | A1 | 8/2014 | Springett et al. |
| 2014/0304631 | A1 | 10/2014 | Wang |
| 2015/0184505 | A1 | 7/2015 | Panicker-Shah |
| 2016/0274978 | A1 | 9/2016 | Strohmenger |
| 2016/0335250 | A1 | 11/2016 | Breitenbach |

OTHER PUBLICATIONS

Ryan Detert, Drag and Drop with Microsoft Internet Explorer 5, Feb. 10, 2003, tech.irt.org, all pages (Year: 2003).

F.M. Chapman, et al.,"Deepwater BOP Control Monitoring—Improving BOP Preventive Maintenance With Control Function Monitoring OTC 20059", Offshore Technology Conference, pp. 1-8, XP055056528, Houston, USA, May 4, 009.

James E. McKay, et al.,"Blowout Preventer (BOP) Health Monitoring", IADC/SPE Drilling Conference and Exhibition, XP055207191, DOI: 10.2118/151182-MS, Jan. 1, 2012.

International Search Report and Written Opinion issued in connection with corresponding PCT Application No. PCT/US2016/027459 dated Jul. 28, 2016.

GRAPHICAL INDEXING FOR LIFE CYCLE MANAGEMENT OF DRILLING SYSTEM ASSETS

CROSS-REFERENCE TO RELATED APPLICATIONS

This application is a Divisional of U.S. Non-Provisional application Ser. No. 15/099,145, filed Apr. 14, 2016, now allowed, which claims benefit to U.S. Provisional Patent Application No. 62/147,210, which was filed on Apr. 14, 2015, the disclosure of which is incorporated herein by reference in its entirety.

BACKGROUND

1. Technical Field

The embodiments disclosed herein relate generally to subsea oil and gas drilling systems. In particular, the embodiments relate to life cycle and usage tracking of subsea oil and gas drilling subsystems and their associated components.

2. Brief Description of the Related Art

In oil and gas drilling applications, it is not currently possible to track or manage life cycle data of particular drilling subsystems in real-time. For example, and not by limitation, maintenance data, equipment status, equipment usage, equipment lifetime, and sensor calibration data are typically entered manually into a database, as the need arises. Furthermore, when a configuration of a particular equipment is changed, for example as result of scheduled or condition-based maintenance tasks, databases including information about the equipment's various subsystems do not reflect the change in configuration until the databases are reconfigured by an operator.

As such, life cycle tracking is typically time-consuming and costly, in addition to being error-prone because it relies on manual data entry. Moreover, the above-noted issues are even more pronounced when managing a large number of assets over their entire life cycles.

SUMMARY

Given the aforementioned deficiencies, a need exists for improved life cycle tracking of oil and gas drilling subsystems. Furthermore, a need exists for seamlessly integrating life cycle tracking with operational and management workflows. The embodiments featured herein help solve these deficiencies.

For example, the embodiments provide a graphical interface that depicts a BOP (blowout preventer) stack configuration. The embodiments allow seamless updating of an operational database coupled to a BOP Mux control system controlling the BOP stack. The operational database can be a (RDBMS)/NoSQL database that includes fast key-value stores, and it can be a document-oriented database and/or an object-oriented database. The operational database can also be a physical database.

In one use case, an operator can remove a pod from the BOP stack configuration by "dragging" a graphical model of the pod (e.g. an icon) off the stack. The operator can then drag and drop another graphical model representing a spare pod onto the stack. These operations automatically disassociate data related to the removed pod from the operational database by removing the data from the operational database and subsequently storing the data in a "dormant" database, which can also be a relational database or a physical database, as described above. In addition, data related to the spare pod are automatically associated with the operational database. These operations automatically halt the life cycle tracking of the removed pod and automatically start the life cycle tracking of the spare pod newly placed on the BOP stack.

In the embodiments, the operational database can be built initially from the original bill of materials and manufacturing, and the operational database provides the configuration of components that can be tracked for cycle count purposes (usage/life cycle). Using a graphical interface, an operator can alter the stack configuration represented in the operational database. Data associated with a given graphical component can be inserted in the database, integrating the stack's configuration represented in the database, while data associated with a removed component can be disassociated from the operational database and placed in a dormant database. Alternate embodiments can include additional features, such as the ability to "tunnel" into the decomposition of a subsystem by "double clicking" a subsystem on the HMI.

The embodiments enable maintaining the configuration order of the stack while tracking usage. This technique also reduces inaccuracies associated with counting component activation. These inaccuracies commonly result in the loss of information valuable to determining reliability and maintainability. Specifically, the embodiments facilitate condition-based maintenance, advantageous in subsea BOP arrangements, particularly those used in high pressure environments.

Systems developed in accordance with the embodiments significantly reduce the search time for finding subsystem elements to address a configuration change. Also provided is a graphical association to assist identification of the correct component/subsystem while maintaining relationships via graphical association. The embodiments can be implemented using one or more computing devices accessing one or more databases.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
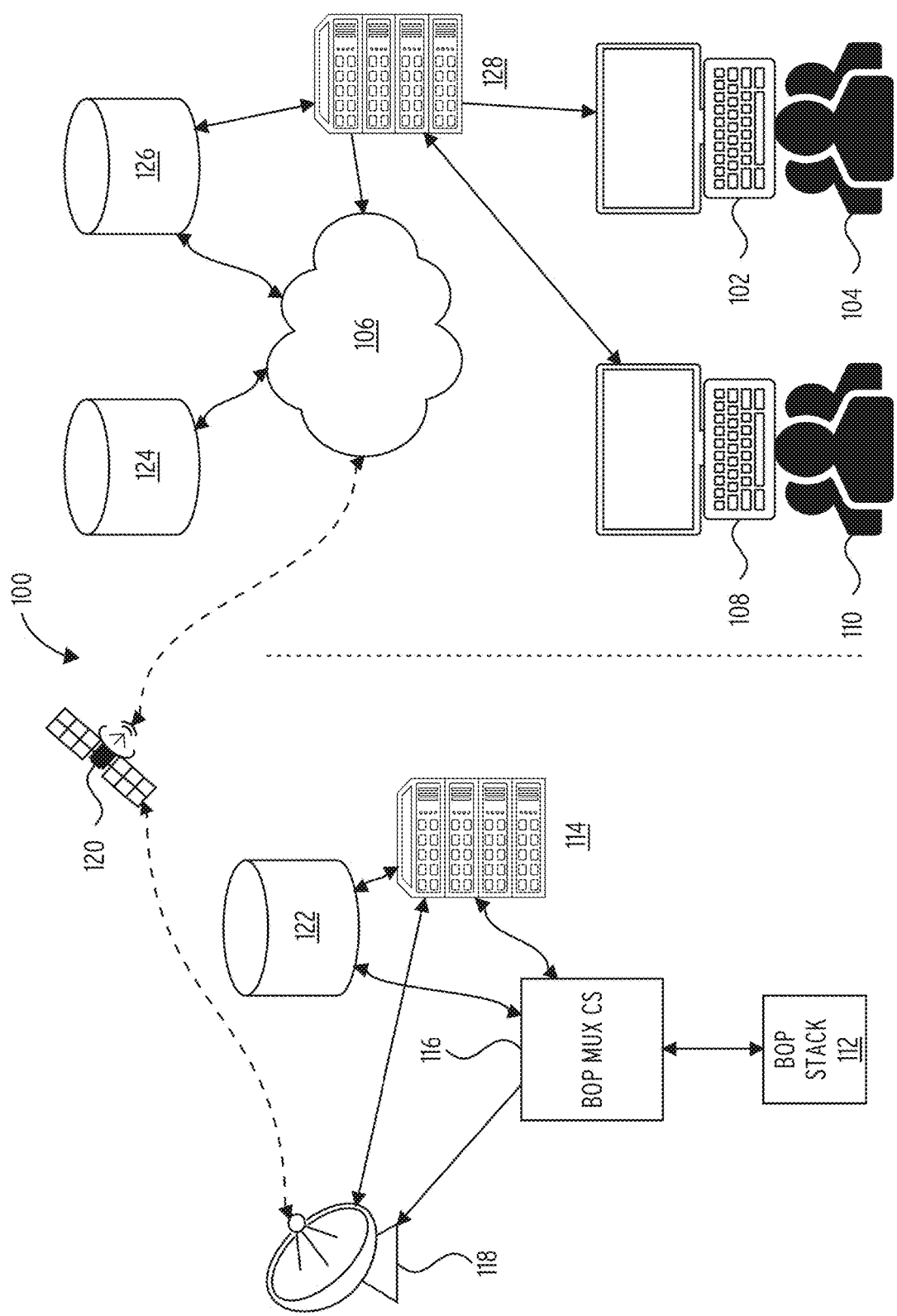
FIG. 1 illustrates a system, according to an embodiment.

FIG. 1 illustrates a system 100 according to an embodiment. System 100 includes a plurality of components, some of which are onshore, depicted on the right side of the dotted line in FIG. 1, and some of which can be offshore on a drill ship or the like, depicted on the left side of the dotted line.

The offshore components can include a plurality of systems used in oil and gas drilling applications. In FIG. 1, for example, the offshore components include a BOP Mux control system 116, a server 114, a blowout preventer stack 112, an operational database 122, and an antenna 118. Blowout preventer stack 112 can be submerged. Antenna 118, BOP Mux control system 116, operational database 122, and server 114 can be located on a drill ship or on a drilling platform or on a rig, and they can be linked to blowout preventer stack 112 via an umbilical system providing power, hydraulic, and communications support. Antenna 118 can provide connectivity between the offshore components and the onshore components via a satellite 120.

The onshore components of system 100 can include a plurality of control terminals (e.g. computer 102 and computer 108) for monitoring and controlling one or more offshore systems. Computer 102 and computer 108 are connectable to satellite 120 via a server 128 and a network 106. The onshore components of exemplary system 100 further include a plurality of dormant databases (e.g. database 124 and database 126), including data associated with various spare components.

In the exemplary embodiments, any one of technicians 110 or technicians 104 can graphically track the usage of an offshore component during its entire life cycle. For example, one of user 110 can access an HMI on computer 108 and query information about a subsystem of blowout preventer stack 112. The querying can be achieved by clicking or double clicking a particular graphical model representing the subsystem.

Furthermore, while dormant databases are shown to be onshore and the operational database is shown to be offshore, they may be co-located, and they may be either onshore or offshore. In some embodiments, all the aforementioned databases can be located on any one of the servers shown in FIG. 1.

The information included in the databases can include life cycle data such as: serial number, commissioning date, operational status, usage, service records, calibration data, and the like. Generally, the information can be located in databases that are local to or remote from blowout preventer stack 112.

Generally speaking, the embodiments can include, in a first aspect, a first database (e.g. an operational database) that directly receives BOP stack data (e.g. cycles used and sensor measurements) from the BOP Mux control system. The first database includes data related to a set of components installed on the BOP stack. In a second aspect, the embodiments include a second database (e.g. a dormant database) that includes life cycle information unrelated to the components installed on the BOP stack, i.e. unrelated to the information included in the first database. Specifically, the information in the second database can be related to a set of spare components, and that information is not updated as the BOP stack is operated. In other words, no life cycle tracking occurs for components having their information stored in the second databases.

As discussed below, a technician can drag and drop a graphical model representing a replacement subsystem into a graphical representation of blowout preventer stack 112. When the graphical model representing the replacement subsystem is dragged and dropped, operational database 122 is automatically reconfigured with the data pertaining to the replacement subsystem. The replaced data (associated with the subsystem) is automatically disassociated and placed in one of the dormant databases.

As such, the embodiments enable tracking the life cycle of an offshore subsystem with the ability to automatically configure an operational database after a change in configuration of the equipment has occurred. Furthermore, the embodiments significantly reduce the search time required to find elements within a subsystem.

Furthermore, the embodiments provide a graphical relationship to aid in identifying the correct component/subsystem while maintaining its relationship with other subsystems via graphical association. For example, system 100 can include specific databases (from the original bill of materials) to represent a given level of fidelity as it relates the configuration of components requiring tracking for cycle count purposes (i.e. for usage/life cycle).

Specifically, using a graphical interface, an operator can alter a configuration of blowout preventer stack 112 in operational database 122. All data associated with a given graphical component is re-associated as result of the graphical change in the HMI. An additional feature is the ability to "tunnel" into the decomposition of a subsystem by "double clicking" a graphical model representing a subsystem on the HMI. The data can include any information pertaining to the component, such as sensor calibration data.

Figure 2:
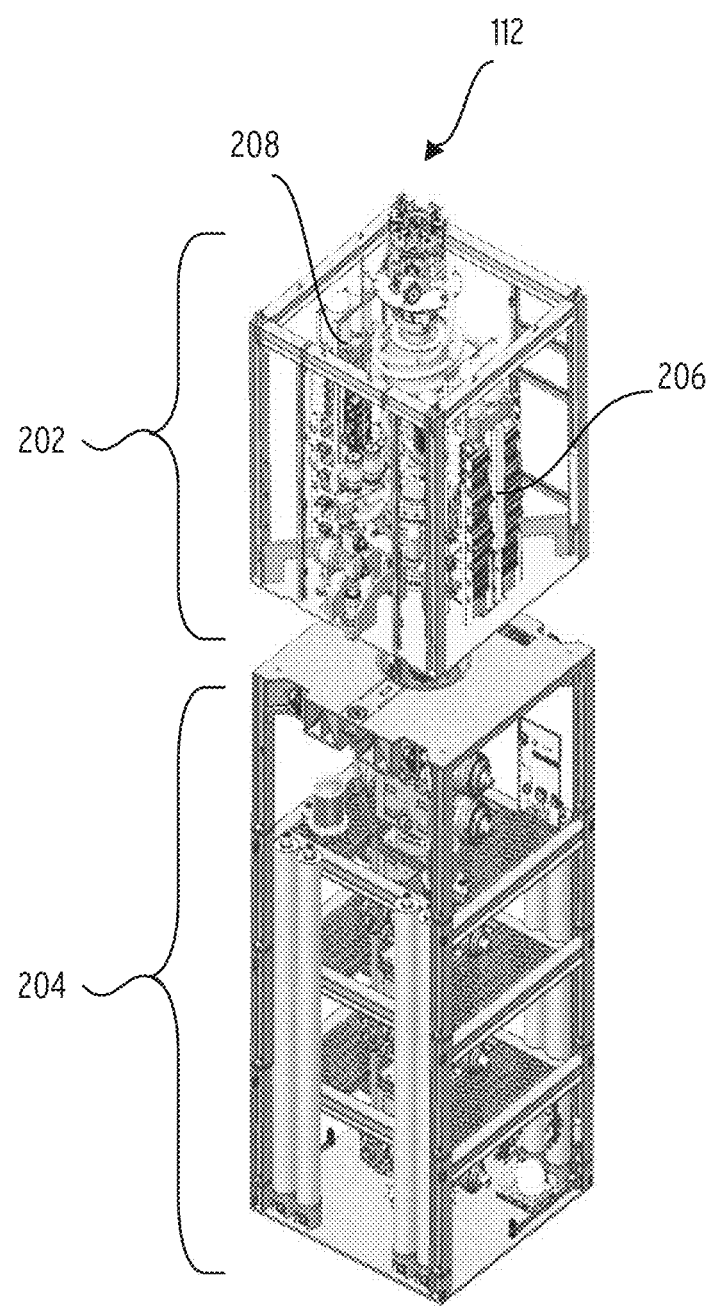
FIG. 2 illustrates a subsystem of a blowout preventer (BOP) stack.

FIG. 2 is an illustration of blowout preventer stack 112. In the embodiments, a 2-D or a 3-D representation of blowout preventer stack 112 can be used in an HMI executed on computer 108. Each of the subsystems of blowout preventer stack 112 can be a specific graphical model linked to one or more entries in a back-end operational database. The one or more entries can include a wide variety of life cycle and/or usage data. This process allows a user to quickly pull up a window displaying the information pertaining to the specific graphical model, and all the information pertaining to the corresponding subsystem.

For example, blowout preventer stack 112 can include a lower marine riser platform (LMRP) 202 and a lower stack 204, each of which includes a plurality of subsystems. LMRP 202 can include one or more pods (e.g. pod 206 and pod 208). Each component in each of the LMRP 202 can be represented graphically on the HMI. For example, pod 206 and pod 208, two components included in LMRP 202, can each have a specific graphical model linked thereto. A graphical model can be a life-like 2-D or 3-D representation, or can be an icon, an item in a pull down menu, or any other graphical representation.

In some embodiments, one or more components may not be represented graphically in either one of LMRP 202 and lower stack 204. Furthermore, for each specific component, the corresponding graphical model may or may not be hierarchical. A subsystem of blowout preventer stack 112 can be represented without or with its subcomponents.

In a subsystem represented with its subcomponents, a user can "tunnel" through the graphical model to access other graphical models representing sub-components of the subsystem. This tunneling can be achieved by clicking or by issuing a predetermined key stroke. In the embodiments, a graphical model representing a subsystem can include a secondary graphical model representing a sub-component of the subsystem. The level of hierarchy may depend on the complexity of the subsystem.

Figure 3:
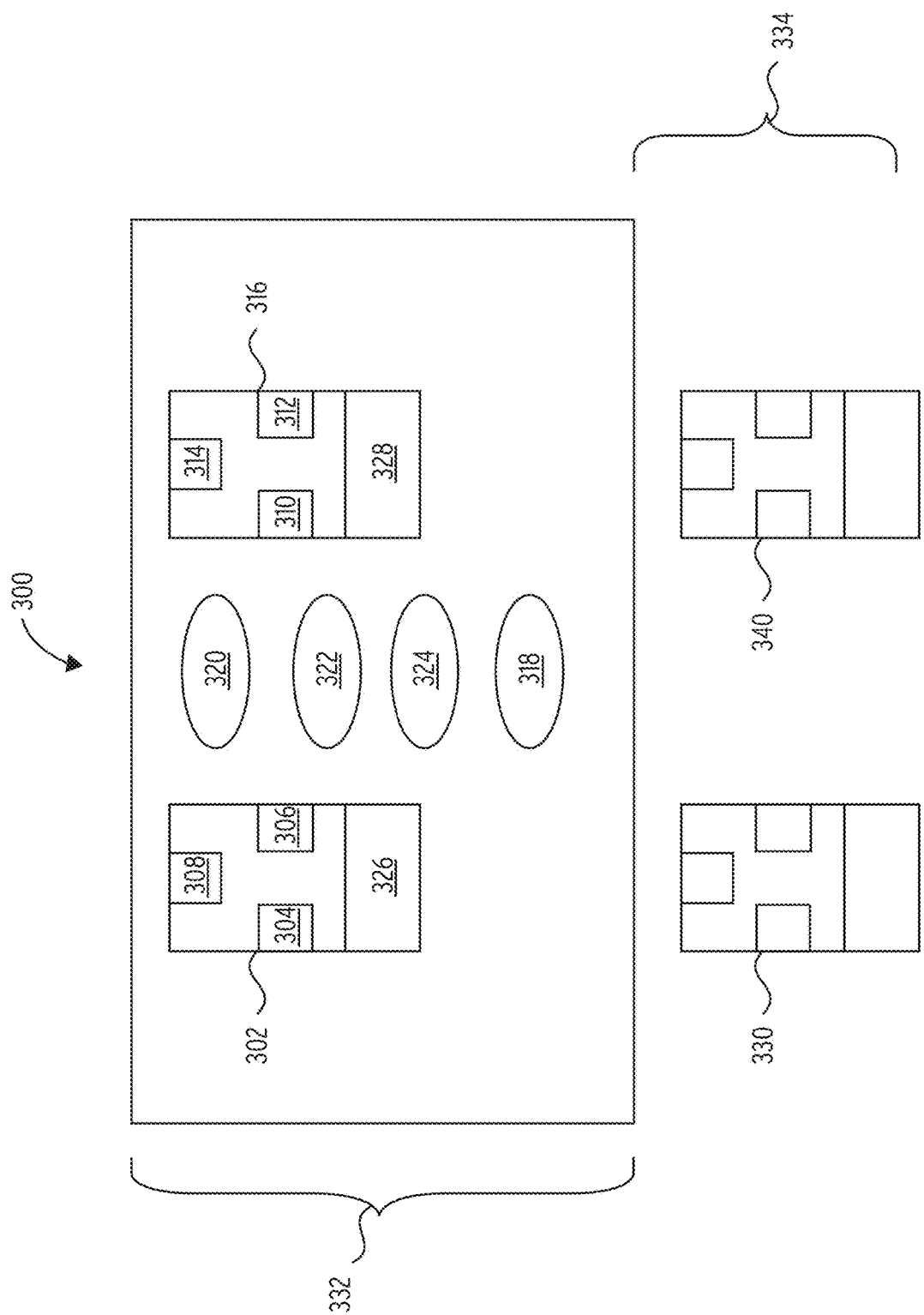
FIG. 3 illustrates a graphical interface of a human machine interface, according to an embodiment.

FIG. 3 illustrates an HMI 300, according to an embodiment. HMI 300 can be embodied in the form of instructions executed by a processor of at least one of computer 108 and computer 102 in FIG. 1. In some embodiments, instructions capable of directing a processor of computer 108 to execute HMI 300 can be located on a storage medium associated with computer 108, or they can be located on server 114 or on server 128.

HMI 300 includes graphical models representing several subsystems of blowout preventer stack 112. For example, graphical model 302 can represent pod 206 and graphical model 316 can represent pod 208. Similarly, HMI 300 can include graphical models for other subsystems of blowout preventer stack 112, such as annular blowout preventer 320, ram blowout preventer 322, ram blowout preventer 324, and ram blowout preventer 318. HMI 300 can also include a graphical model 330 and a graphical model 340, representing a spare pod inventoried and available for use as a replacement for either one of pods 206 or 208.

In each graphical model representing a pod, sub-components can be represented by their own graphical models. For example, graphical model 302 includes sub-components 304, 306, 308, and 326. Graphical model 316 includes sub-components 310, 312, 314, and 328. The spare pods represented by graphical model 330 and graphical model 340 include graphical models representing their respective sub-components (not numbered in FIG. 3). In some embodiments, the graphical models associated with the sub-components can be visible. In other embodiments, they may not be visible, and an operator clicks or issues a keyboard command to navigate through the hierarchy.

In one scenario, an operator can move graphical model 316 out of a first region 332 of HMI 300 and place it elsewhere, for example in a second region 334. The operator can then drag and drop graphical model 330 into the region where graphical model 316 was previously located. This action automatically reconfigures the back-end database by identifying and associating the right data model with the right configuration index pertaining to graphical model 330 by replacing with the graphical model associated with the right configuration 316.

It is noted that operations other than dragging and dropping can also be used to reconfigure the operational database. Generally, any action performed from the HMI can have the effect of re-associating data from and changing the operational database. For example, a graphical model associated with a spare part can be accessed from a pull-down menu, a radio button, or any other graphical object typically used in graphical user interfaces (GUIs) of HMIs. Moreover, in other embodiments, a user can export a configuration file, alter the exported file with data associated with a spare part, and subsequently import the altered file into the HMI in order to cause the re-association. In yet other embodiments, a voice command can be issued by the operator to effect a change in the operational database.

Additionally, during maintenance, once pod 208 is replaced with the spare pod associated with graphical model 330, no new data need to be entered. In other words, life cycle data pertaining to the spare pod is automatically stored in operational database 122, and the data associated with pod 208 is placed in a dormant database and dis-associated with operational database 122. Furthermore, if and when pod 208 is deployed to another BOP stack, its data will automatically be associated with the operational database of the BOP stack in which it is installed. No user intervention beyond interaction through the HMI is needed. As such, the embodiments provide a seamless integration of life cycle management and tracking techniques. Moreover, the embodiments allow automated life cycle tracking when assets are moved for use with other drill ships/rigs, or for repair, and generally, when parts are swapped.

In another scenario, the embodiments provide an automated means for delivering calibration data to BOP Mux control system 116. The calibration data can be associated with one or more sensors located in a subsystem of blowout preventer stack 112. By example, and not by limitation, such sensors can sense temperature, pressure, position, vibration, and flow. Other sensors typically used in oil and gas drilling systems are also contemplated.

Calibration can be required due to errors in absolute measurements of a variable of interest. As such, the calibration data may be provided to BOP Mux control system 116 from a cloud network, via antenna 118. Specifically, the calibration data may be associated with a specific sensor, prior to its installation on a subsystem.

For example, calibration data for a sensor of pod 208, such as sub-component 314, can be loaded on operational database 122. A probe can be used to read the sensor's serial number automatically, such as with a bar code or radio frequency identification (RFID) reader. The calibration data can then be associated in the database with the serial number of the sensor, to uniquely correlate the sensor with its calibration data.

In the aforementioned manner, if a sensor is reassigned, by dropping and dragging its graphical model from a first pod to a second pod, the calibration data associated with the sensor in the operational database is automatically disassociated with the first pod. Thus, in the embodiments, there is no need for re-calibration because BOP Mux control system 116 can automatically be provided the appropriate calibration data when reassignment is complete.

Figure 4:
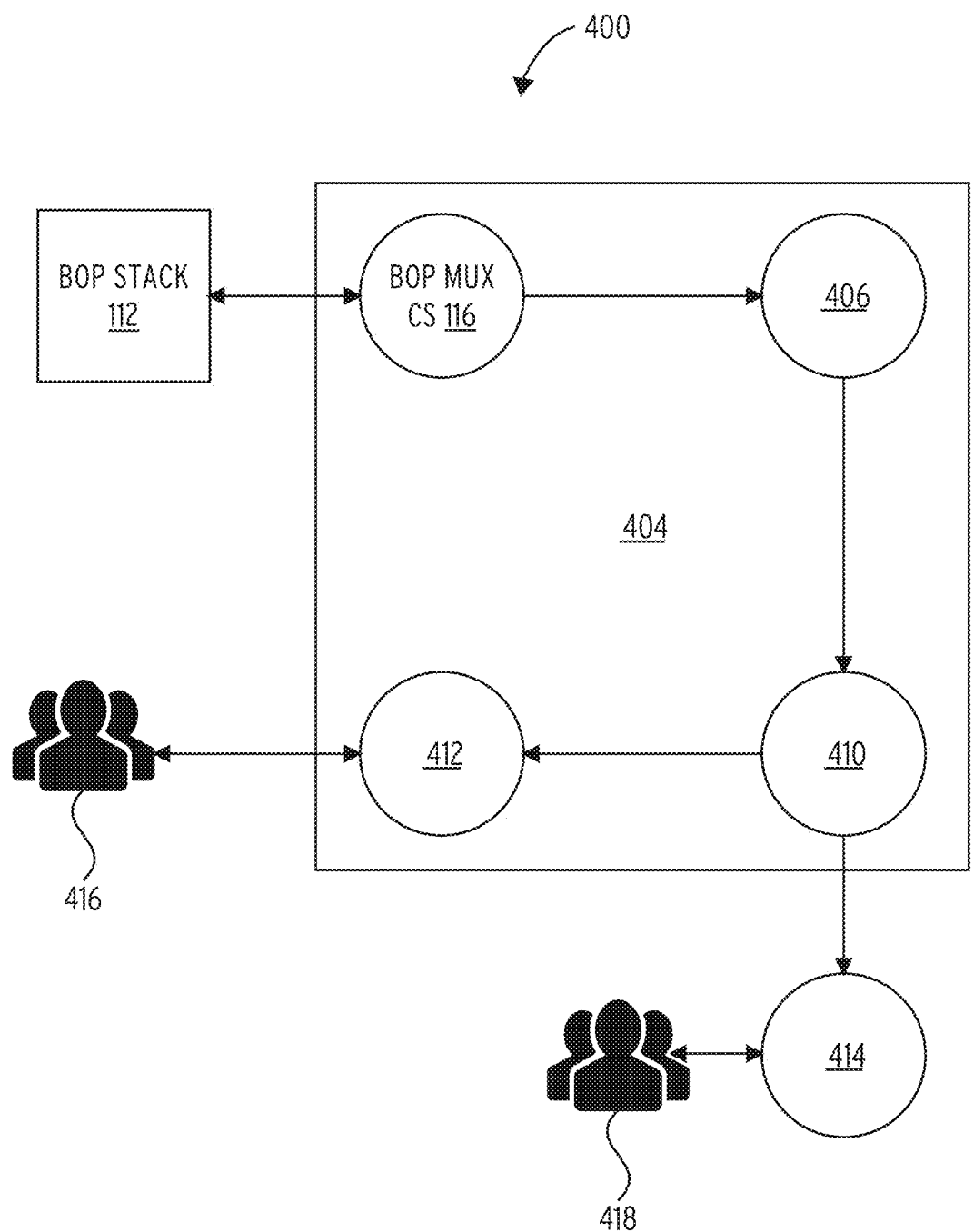
FIG. 4 is an illustration of a system, according an embodiment.

FIG. 4 is an illustration of a system 400 according to the embodiments. In particular, FIG. 4 depicts a scenario for extracting and managing data from surface controls (i.e. either from a drill ship or rig 404), or from onshore terminals, as shown in FIG. 1.

Blowout preventer stack 112 can be controlled by BOP Mux control system 116. Data and events associated with blowout preventer stack 112 can be logged in module 406, which can be a data storage medium. Module 410, which can be a server configured according to a Big Data framework, can pull data from module 406. Module 410 organizes the data into insightful information available to the operators.

For example, module 410 can organize data retrieved from module 406 by applying predetermined rules to the data. Module 410 can subsequently organize the data according to results obtained from applying the rules. Cycle counts, equipment status, and failure predictions are exemplary information that can be inferred from raw measured data retrieved from module 406.

The generated information can be saved in an operational database and associated with corresponding subsystems of blowout preventer stack 112. This information can be retrieved for visualization by rig 404 personnel (technicians 416) via a module 412, which can be located on a computer terminal on rig 404. The information can also be retrieved for visualization by control personnel located offshore (technicians 418), via a module 414. The module 414 can be a control portal located on an offshore terminal. Generally speaking, module 414 can be a workstation, a tablet device, or an application running on a workstation. The information can be visualized, and as described above, can be disassociated with a particular subsystem if that subsystem is replaced.

Figure 5:
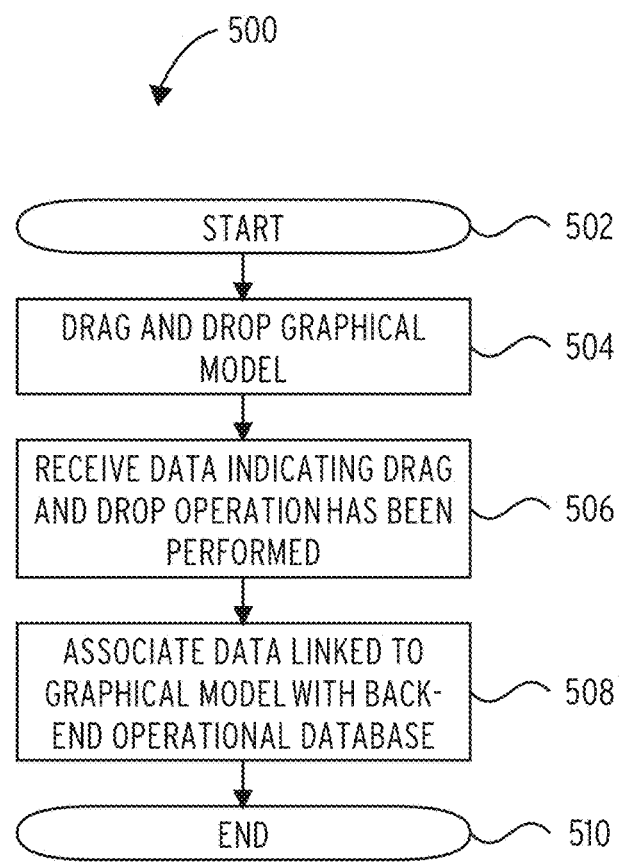
FIG. 5 depicts a flow chart of a method, according to an embodiment.

FIG. 5 illustrates an exemplary method 500, according to an embodiment. Method 500 can be executed by a processor of a computing device. Method 500 begins at block 502 and includes dragging and dropping a graphical model in a first region of a human machine interface (block 504), as described with respect to FIG. 3. Once the drag and drop operation has been completed, the processor can receive a command indicating that the drag and drop operation has been completed (block 506).

Method 500 can include associating data related to the graphical model to a back-end operational database (block 508). In addition, any data associated with a previous graphical model removed prior to dragging and dropping the graphical model can be disassociated with the operational database. Method 500 ends at block 510.

Method 500 includes effecting, by a processor, a change in a operational database including information relating to a blowout preventer stack configuration. The change can be performed in response to a drag and drop operation performed on an HMI.

The drag and drop operation can include moving a first graphical model to a first region of the HMI. The graphical model can be associated with a subsystem (e.g., a pod) of a blowout preventer.

Method 500 can also include effecting an additional change in another operational database, in addition to the first operational database. That is, the dragging and dropping operation may trigger a reconfiguration of several databases.

In other embodiments, the change may include removing a first data set from the operational database, the first data set being associated with the first graphical model. The change can also include disassociating a second data set with the database, the second data set being distinct from the first data set. Specifically, the second data set can be associated with a subsystem intended to be replaced as a result of the drag and drop operation.

Figure 6:
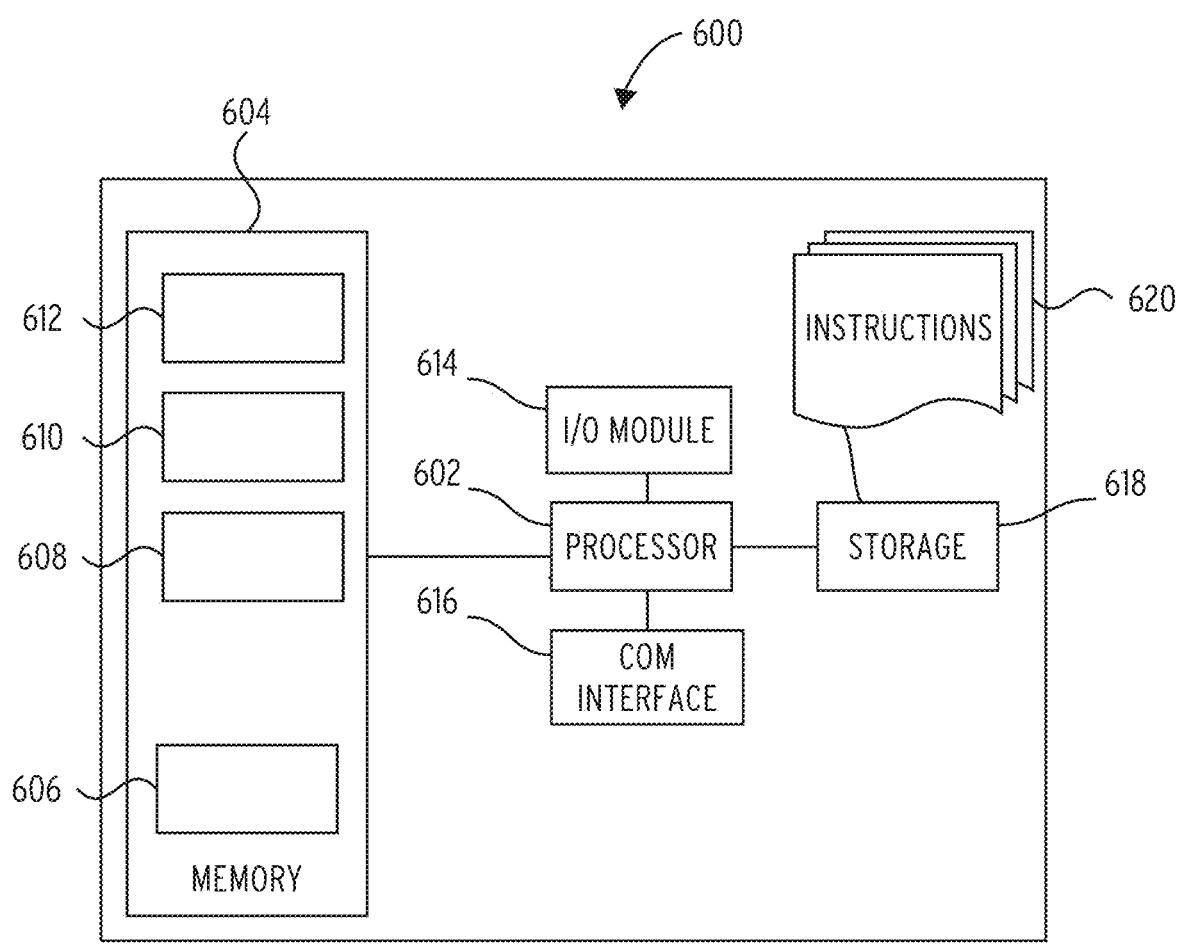
FIG. 6 is a block diagram of a device, according to an embodiment.

FIG. 6 is a block diagram of controller 600, including a processor 602 having a specific structure. The specific structure is imparted to processor 602 by instructions stored in a memory 604 and/or by instructions 620 that can be fetched by processor 602 from a storage medium 618. The storage medium 618 may be co-located with controller 600, or located elsewhere and communicatively coupled to controller 600.

Controller 600 can be a stand-alone programmable system, or can be a programmable system located in a much larger system. For example, controller 600 can be part of server 114 or of server 128, and is remotely accessible.

Controller 600 includes one or more hardware and/or software components configured to fetch, decode, execute, store, analyze, distribute, evaluate, and/or categorize information. Furthermore, controller 600 can include an input/output (I/O) 414 configured to interface with a plurality of components, including operational and dormant databases, such as databases 122, 124, and 126.

Processor 602 includes one or more processing devices or cores (not shown). In the embodiments, processor 602 can include a plurality of processors, each having either one or more cores. Processor 602 can be configured to execute instructions fetched from memory 604, i.e. from one of memory block 612, memory block 610, memory block 608, or memory block 606. The can also be fetched from storage medium 618, or from a remote device connected to controller 600 via communication interface 616.

Furthermore, without loss of generality, storage medium 618 and/or memory 604 may include a volatile or non-volatile, magnetic, semiconductor, tape, optical, removable, non-removable, read-only, random-access, or any type of non-transitory computer-readable computer medium. Storage medium 618 and/or memory 604 may include programs and/or other information that may be used by processor 602. Furthermore, storage medium 618 may be configured to log data processed, recorded, or collected during the operation of controller 600. The data may be time-stamped, location-stamped, cataloged, indexed, or organized in a variety of ways consistent with data storage practice.

By way of example, and not by limitation, memory block 606 can include instructions that, when executed by processor 602, cause processor 602 to perform certain operations. The operations can include effecting a change in an operational database coupled to the processor in response to a drag and drop operation having been performed on a human machine interface (HMI). The change can include associating information included in a dormant database to the operational database. In the embodiments, the HMI can include a first graphical model and a first region, and the drag and drop operation can include moving the first graphical model to the first region.

The first graphical model can be associated with a subsystem of a blowout preventer stack, and the subsystem can be a pod. The operations may further include dragging a second graphical model away from the first region prior to moving the first graphical model to the first region.

The operations can include effecting an additional change in another operational database. The change can include removing a first data set from the operational database. The change can also include associating a second data set with the graphical model moved by the drag and drop operation. The first and second data sets are distinct. By way of example, the operational database can be an object-oriented database.

CONCLUSION

Those skilled in the relevant art(s) will appreciate that various adaptations and modifications of the embodiments described above can be configured without departing from the scope and spirit of the disclosure. For example, the embodiments can be used to provide life cycle tracking data to third-party certification authorities, regulators, and the like. In addition, the embodiments are applicable to subsea and surface systems, and any industrial setting in which life cycle tracking is used is contemplated. For example, the embodiments can be used to track parts at power plants.

Moreover, the embodiments provide life cycle tracking ability for an entire part's lifetime, not just when the part is deployed. For example, the databases may include cycle counts originating from testing a component at the manufacturing plant, before it is deployed. Consequently, the embodiments can also be used to track life cycle data during the manufacturing and testing phases. As such, in view of the foregoing, it is to be understood that, within the scope of the appended claims, the disclosure may be practiced other than as specifically described herein.

What is claimed is:

1. A system configured to interface with a blowout preventer (BOP) stack, the system comprising:
    a control system communicatively coupled to the BOP stack and an interface, the control system being configured to track a status of the BOP stack by receiving data related to a first set of subsystems of the BOP stack, the data being representative of a physical configuration of the BOP stack;
    wherein, the control system is further configured to maintain a first database relative to an operational state of the BOP stack, the first database including the data related to the first set of subsystems, the first set of subsystems being represented by a graphical model, each graphical model being (i) illustrated via the interface and (ii) specifically linked to one or more of the data related to the first set of subsystems;
    wherein in response to detecting a change in the physical configuration, the change being associated with the first set of subsystems having been replaced with a second set of subsystems, the control system is configured to automatically update the first database and second database by (i) removing from the first database, the one or more data linked to the graphical model representing the first set of subsystems (ii) storing the one or more data in a second database and (iii) transferring from the second database, new data specifically linked to a graphical model representing a second set of subsystems;
    wherein the second database is not updated as the BOP stack is being operated; and
    wherein (i)-(iii) are carried out in response to performing actions, via the interface, that allow a user to manipulate the graphical models representing the first set of subsystems and the graphical models representing the second set of subsystems.

2. The system of claim 1, wherein the first set of subsystems includes at least one pod.

3. The system of claim 1, wherein the second set of subsystems includes at least one pod.

4. The system of claim 1, wherein the second database includes information relating to one or more spare parts for the BOP stack.

5. The system of claim 1, wherein the control system is configured to disassociate information related to the first set of subsystems with the BOP stack upon the change occurring.

6. The system of claim 5, wherein the control system is further configured to associate new information related to the second set of subsystems with the BOP stack upon the change occurring.

7. The system of claim 1, wherein the first database is a relational database.

8. The system of claim 1, wherein the second database is a relational database.

9. The system of claim 1, wherein the interface is a graphical user interface.

10. The system of claim 9, further comprising a front-end graphical user interface representative of the BOP stack.

11. The system of claim 10, wherein the first database is connected from a back-end to the front-end graphical user interface.

12. The system of claim 10, wherein the second database is connected from a back-end to the graphical user interface.

13. The system of claim 1, wherein the actions include dragging the graphical model representing the first subsystem away from a first region of the interface prior to moving the graphical model representing the second subsystem into the first region of the interface.

14. The system of claim 1, wherein the actions include accessing the graphical models representing the first subsystem and the graphical models representing the second subsystem from a pull-down menu or radio button.

* * * * *